UNITED STATES PATENT OFFICE.

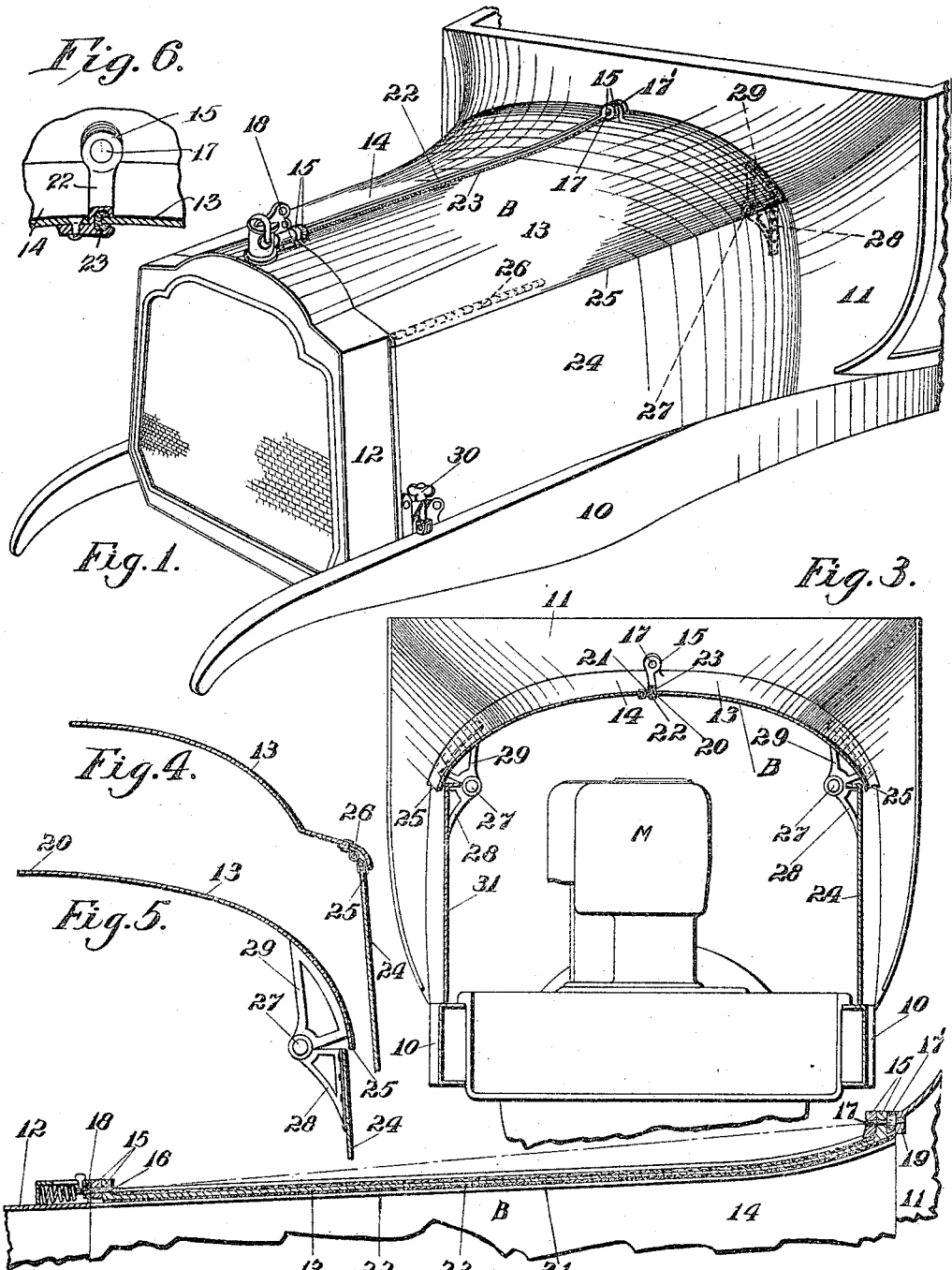

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE BONNET.

1,305,137.   Specification of Letters Patent.   Patented May 27, 1919.

Application filed October 1, 1914. Serial No. 864,460.

*To all whom it may concern:*

Be it known that I, ALLEN LOOMIS, a citizen of the United States, and resident of Detroit, Wayne county, State of Michigan, have invented certain new and useful Improvements in Motor-Vehicle Bonnets, of which the following is a specification.

This invention relates to motor vehicles and particularly to the motor housing or inclosing bonnet thereof.

Motor bonnets, as generally constructed heretofore, have comprised two or more sections hinged together, the sections being substantially straight lengthwise thereof, and the adjacent or meeting portions of the sections having a straight edge substantially coinciding with the axis of the pivot which connects the sections together.

One of the objects of the present invention is to provide a motor bonnet having a plurality of hinged sections so formed that they diverge or deviate from a straight line lengthwise thereof. These sections may be hinged together with their adjacent or meeting edges curved longitudinally thereof to form a bonnet of so-called stream-line design.

Another object is to provide a bonnet of the above type with means for permitting the adjacent edges of the sections to overhang one another when moved about said hinged connection.

Another object is to provide a motor bonnet of the above type with yielding or flexible means between said longitudinally curved or deviating portions.

These and other objects will appear from the following description, taken in connection with the drawings which form a part of this specification, and in which:

Figure 1 is a perspective view of portions of a motor vehicle embodying a form of my improved motor bonnet;

Fig. 2 is a longitudinal section through approximately the center of the upper part of the bonnet shown in Fig. 1;

Fig. 3 is a transverse section approximately through the center of the bonnet;

Fig. 4 is a transverse section through portions of the forward end of the bonnet and showing the form of hinge used; and Fig. 5 is a transverse section through a portion of the rearward end of the bonnet and showing a form of hinge used.

Fig. 6 is an enlarged detail section through the joint between the bonnet sections.

Referring to the drawings, 10 are the side members of the frame, on which may be mounted a body 11 shown as of stream-line design, and a radiator 12 of any desired form or construction. Arranged over the frame between the body and the radiator is a housing or inclosing bonnet B for the motor M, which bonnet will now be particularly described.

In the form of the invention shown, the bonnet comprises two upper members 13 and 14 curved longitudinally thereof and pivotally connected or hinged together by means which will now be described. Arranged adjacent the opposite ends of each of the upper sections, are ears 15 which are trunnioned on the pins 16 and 17, supported by the flanges 18 and 19 arranged on the radiator 12 and the body 11, respectively.

The sections 13 and 14 may be assembled on the supporting pins 16 and 17 by inserting the pin 17 in an opening in the inturned flange 19 arranged on the body 11, and then mounting one of the trunnions or ears 15 of each of the sections 13 and 14 on the projecting end of the pin 17. A flange 17' may be formed on the pin 17 to prevent displacement of the pin when said sections are mounted thereon. The opposite end of the sections 13 and 14 may then be placed in position and the spring pressed pin 16 may be inserted in the ears 15 arranged on the opposite ends of the sections. It will be seen that the pin 16 and its coöperating parts comprise a form of latch which may be easily operated to facilitate the assembling and disassembling of the bonnet sections.

It will be seen that while the two pins 16 and 17 which pivotally connect or hinge the two upper sections 13 and 14 together, have a common axis, the adjacent portions or meeting edges 20 and 21 of the sections, deviate or diverge from a straight line which coincides with the axis. In the form shown, the sections are curved longitudinally thereof between said hinges to form a bonnet of the stream-line type.

As a result of the fact that the meeting edges 20 and 21 are longitudinally curved and do not coincide with the axis of the pins 16 and 17, these longitudinally curved portions will move through a greater distance than the portion of their respective sections which are hinged on said pins. To permit this greater range of movement, there are no hinged connections between the sections 13 and 14 intermediate the two pins 16 and 17 arranged adjacent the opposite ends of each of the sections, and to prevent relative transverse movement between the two sections intermediate the two hinged connections and to provide a water tight joint, the inner edge 21 of the section 14 is grooved longitudinally thereof, as at 22, and has arranged therein a soft material such as felt 23, against which the edge 20 of the other section 13 abuts. This forms a flexible or yielding connection between the longitudinally curved portions of said sections and at the same time permits the greater range of movement which these portions are required to travel than the portions adjacent the hinge connection, when the sections are moved about the pivots 16 and 17.

It will be seen that the lower section 24, which is symmetrical with the opposite section, is straight for a distance lengthwise thereof, and is then curved to its end. It will also be seen that arranged inwardly of the outer end 25 of the section 13 and concealed thereby, is a hinged connection 26 between the sections 13 and 24. Arranged between the curved portions of the sections is a hinge 27 comprising a lower leaf 28 and upper leaf 29 suitably secured to the lower section 24 and upper section 13, respectively. These leaves 28 and 29 are so arranged on the pivot 27 that one leaf 29 may overlap the other leaf 28 and permit the lower portion 25 of the upper section 13 to overhang the upper edge of the lower section 24 when the lower section is moved about the pivotal connection or hinge 26, and the pivot 27 which connects the leaves 28 and 29. A fastener 30 is provided to secure the lower edge of the section 24 to the frame member 10, thus locking the bonnet in inclosed position. It will be understood that the lower section 31 which is hinged to the section 14 is connected by similar devices and operates similarly to sections 13 and 24 as just described.

It will be understood that the form shown herein is illustrative only of the invention, and various modifications thereof may be made without departing from the spirit or scope of the invention as defined by the claims.

Having thus described my invention, what I claim and desire to secure by Letters Patent is:—

1. In a motor vehicle, a motor bonnet comprising pivotally connected sections, having portions deviating lengthwise thereof from a straight line.

2. In a motor vehicle, a motor bonnet having a plurality of sections, and a pair of hinges for connecting said sections together, the adjacent meeting edges of said sections deviating lengthwise thereof from the axes of said hinges.

3. In a motor vehicle, a motor bonnet having a plurality of sections, and hinges for connecting said sections together, the adjacent hinged portions of said sections being curved longitudinally thereof.

4. In a motor vehicle, a motor bonnet comprising a plurality of sections, and means adjacent the ends of said sections for pivotally connecting said sections together, said sections having a portion intermediate said pivots which deviates from a straight line lengthwise thereof.

5. In a motor vehicle, a motor bonnet comprising a plurality of sections, and means for forming a pivotal connection between each of the opposite ends of one of said sections and each of the similar ends of another of said sections, said sections having a longitudinally curved portion formed therein intermediate said pivotal connections.

6. In a motor vehicle, a motor bonnet having a plurality of sections, hinges for connecting said sections together, the adjacent portions of said sections being curved longitudinally thereof, and a filling piece between the curved portions of said sections.

7. In a motor vehicle, a motor bonnet having a plurality of sections, hinges for connecting said sections together, the adjacent portions of said sections being curved longitudinally thereof, and a filling piece between the curved portions of said sections.

8. In a motor vehicle, a motor bonnet having a plurality of sections, hinges for connecting said sections together, the adjacent portions of said sections being curved longitudinally thereof, and one of said sections having a pocket formed in its curved portion and having a yielding lining arranged therein for engagement with the adjacent curved portion of the sections connected thereto.

9. In a motor vehicle, a motor bonnet comprising a plurality of sections, hinges at the ends of the bonnet for each of said sections, and means intermediate said hinges for closing the joint between the adjacent edges of the sections.

10. In a motor vehicle, a motor bonnet having a plurality of sections, and hinges at the ends of said sections to permit raising and lowering thereof, the adjacent edges of said sections being non-coincident with the axes of said hinges so that they swing away from and toward each other as the sections are raised and lowered.

11. In a motor vehicle, a motor bonnet having a plurality of sections, and hinges at the ends of said sections to permit raising and lowering thereof, the adjacent edges of said sections intermediate said hinges being non-coincident with the axes of said hinges so that they swing away from and toward each other as the sections are raised and lowered.

12. In a motor vehicle, a motor bonnet having a plurality of sections, hinges at the ends of said sections to permit raising and lowering thereof, the adjacent edges of said sections being non-coincident with the axes of said hinges so that they swing away from and toward each other as the sections are raised and lowered, and a filling piece arranged between said sections.

13. In a motor vehicle, a motor bonnet having a plurality of sections, hinges at the ends of said sections to permit raising and lowering thereof, the adjacent edges of said sections being non-coincident with the axes of said hinges so that they swing away from and toward each other as the sections are raised and lowered, and a filling piece arranged between the adjacent edges of said sections.

14. In a motor vehicle, a motor bonnet having a plurality of sections, hinges at the ends of said sections to permit raising and lowering thereof, the adjacent edges of said sections being non-coincident with the axes of said hinges so that they swing away from and toward each other as the sections are raised and lowered, and a filling piece adapted to close the space between the adjacent edges of said sections.

15. In a motor vehicle, a motor bonnet having a plurality of sections, hinges for said sections to permit raising and lowering thereof, the adjacent longitudinal edges of said sections being non-coincident with the axes of said hinges so that they swing away from and toward each other as the sections are raised and lowered, and a filling piece arranged in the space between said adjacent edges and adapted to close said space when the sections are lowered.

16. In a motor vehicle, a motor bonnet having a plurality of sections, hinges for said sections to permit raising and lowering thereof, the adjacent longitudinal edges of said sections being non-coincident with the axes of said hinges so that they swing away from and toward each other as the sections are raised and lowered, and a filling piece arranged to provide a water tight joint between said adjacent edges.

17. In a motor vehicle the combination with front and rear supports for a motor bonnet, of a motor bonnet comprising a plurality of sections, means at the ends of one of such sections to pivot the same to said supports on which means said section may be raised and lowered, and means intermediate and independent of said pivoting means so arranged that when said section is in lowered position one of its longitudinal edges is overlapped by said means and when said section is in raised position that longitudinal edge is separated from said means.

In testimony whereof I affix my signature in the presence of two witnesses.

ALLEN LOOMIS.

Witnesses:
LeRoi J. Williams,
Claio J. Cote.

Copies of this patent may be obtained for five cents each, by addressing the "Commissioner of Patents, Washington, D. C."